United States Patent [19]

Shimura et al.

[11] Patent Number: 4,643,394
[45] Date of Patent: Feb. 17, 1987

[54] GAS SOLENOID VALVE

[75] Inventors: Katsumasa Shimura; Tetsuro Nakamura, both of Kasugai, Japan

[73] Assignee: C.K.D. Controls Co., Ltd., Aichi, Japan

[21] Appl. No.: 680,650

[22] Filed: Dec. 11, 1984

[30] Foreign Application Priority Data

Jun. 12, 1984 [JP] Japan .................. 59-86843[U]

[51] Int. Cl.$^4$ ............................................. F16K 31/02
[52] U.S. Cl. ........................ 251/129.08; 251/65; 335/222; 335/278
[58] Field of Search ............... 335/222, 278; 251/65, 251/129, 139, 129.01, 129.08, 129.21, 129.15, 251/DIG. 6; 137/325

[56] References Cited

U.S. PATENT DOCUMENTS

| 2,449,438 | 9/1948 | Wisegarver | 335/278 |
| 3,424,951 | 1/1969 | Barker | 251/129 |
| 3,550,632 | 12/1970 | Noakes et al. | 251/139 |
| 3,665,962 | 5/1972 | Dornseiffen | 251/129.15 |
| 3,818,938 | 6/1974 | Barbier et al. | 335/278 |
| 4,236,131 | 11/1980 | Grandclement | 335/278 |
| 4,428,559 | 1/1984 | Ichiryu et al. | 335/278 |
| 4,500,068 | 2/1985 | Rasmussen et al. | 251/129 |

FOREIGN PATENT DOCUMENTS 58-69569  4/1983  Japan ..................... 251/DIG. 6

Primary Examiner—Samuel Scott
Assistant Examiner—Noah Kamen
Attorney, Agent, or Firm—Wenderoth, Lind & Ponack

[57] ABSTRACT

A gas solenoid valve comprising a magnetic circuit formed with a fixed iron core, magnets and a magnetic member; a coil-holder movably provided with respect to the outer periphery of the fixed iron core and having a magnetic coil wound around itself; a sleeve accommodated within the magnets and spaced apart from the outer periphery of the fixed iron core for a predetermined distance; an actuating portion formed with the fixed iron core; the fixed iron core, the magnets and a magnetic member all fixedly covered with a molding resin from outside; and a governing portion engaged with the actuating portion.

16 Claims, 2 Drawing Figures

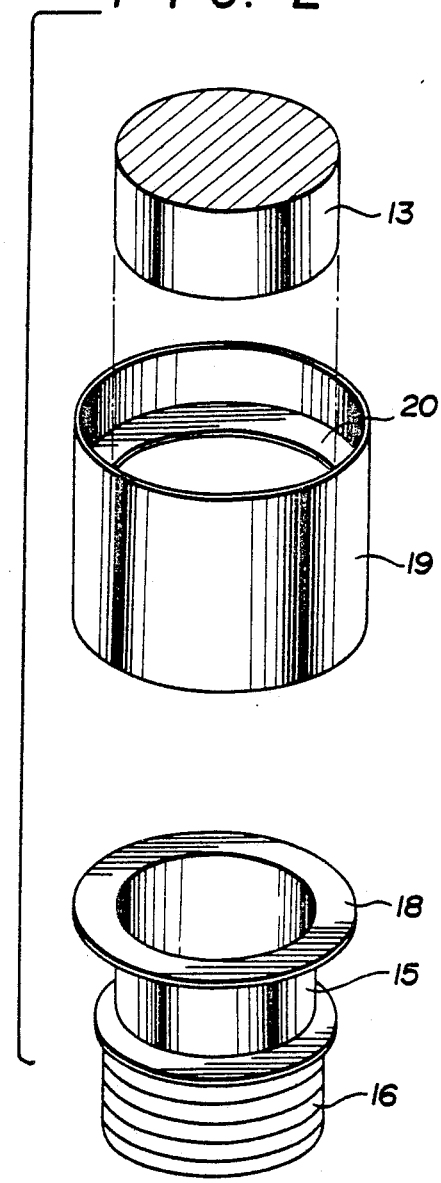

GAS SOLENOID VALVE

BACKGROUND OF THE INVENTION

This invention relates to a gas solenoid valve of the type which is designed by to constantly control the feeding amount of a fuel gas means of an electric signal emitted from outside when a fuel gas is fed into gas appliances such as hot-water heaters.

Heretofore, there is known a gas valve of this type wherein a hollow cylindrical coil-holder is inserted in ring shaped magnets and an iron core is accomodated within said cylindrical hollow of the coil-holder. In this prior art, although the magnets which are actuated with a magnet coil wound around the coil-holder for regulating the position of the coil-holder are molded and covered at their outer peripheries with a synthetic resin, the synthetic resin often leaks through a gap and is hardened to form a fin. When the fin grows, the outer surface of the coil-holder is caught by its tip end, thereby disturbing the smooth movement of the coil-holder.

Also, there is known another gas valve wherein the position of a plunger for actuating a valve disc is controlled by means of adequately controlling the amount of current flowing into a magnetic coil, so that the amount of gas to be fed into a governor can be controlled. In order to continuously and accurately regulate the position of the plunger by means of an electric signal emitted from outside as in the foregoing case, it is essential to minimize the mechanical resistance, as much as possible, caused by the sliding movement of the plunger which contacts with other portions while sliding.

To this end, the afore-mentioned prior art adopts a means for supporting both the upper and lower ends of the plunger by a leaf spring. However, in such supporting structure, since the force received from the supporting spring varies depending on the position of the plunger, it is difficult to accurately set the corresponding relationship between the value of the controlling current applied from outside and the position of the plunger.

The present invention is provided in order to eliminate the above-mentioned disadvantages which were inherent in the conventional gas valves.

SUMMARY OF THE INVENTION

It is therefore a general object of the present invention to provide an improved gas solenoid valve which can adequately control the feeding amount of gas by varying the current which flows into a magnetic coil.

Another object of the invention is to provide a valve wherein a coil-holder can move smoothly without being disturbed by a fin or the like produced during molding. A further object of the invention is to provide a valve wherein the positional relation between a magnetic coil and magnets are maintained constant, so that magnetic character is stable and the flowing amount of gas can be controlled highly accurately.

In order to achieve the above object and others, there is essentially provided a gas solenoid valve comprising a magnetic circuit formed with a fixed iron core, magnets and a magnetic member; a coil-holder movably provided with respect to the outer periphery of said fixed iron core and having a magnetic coil wound therearound; a sleeve accomodated within said magnets in such a manner as to be spaced apart for a predetermined distance from the outer periphery of said fixed iron core; an acutating portion formed with said fixed iron core, magnets and a magnetic member all fixedly covered with a molding resin from outside; and a governing portion engaged with said acutating portion.

Many other advantages and features of the present invention will become apparent to those versed in the art upon making reference to the detailed description and the accompanying sheets of drawings in which a preferred structural embodiment incorporating the principles of the present invention is shown by way of example.

BRIEF DESCRIPTION OF THE DRAWINGS

FIG. 2 is a perspective view schematically showing components of the above which are material to the present invention.

DETAILED DESCRIPTION OF THE EMBODIMENT

Figure 1:
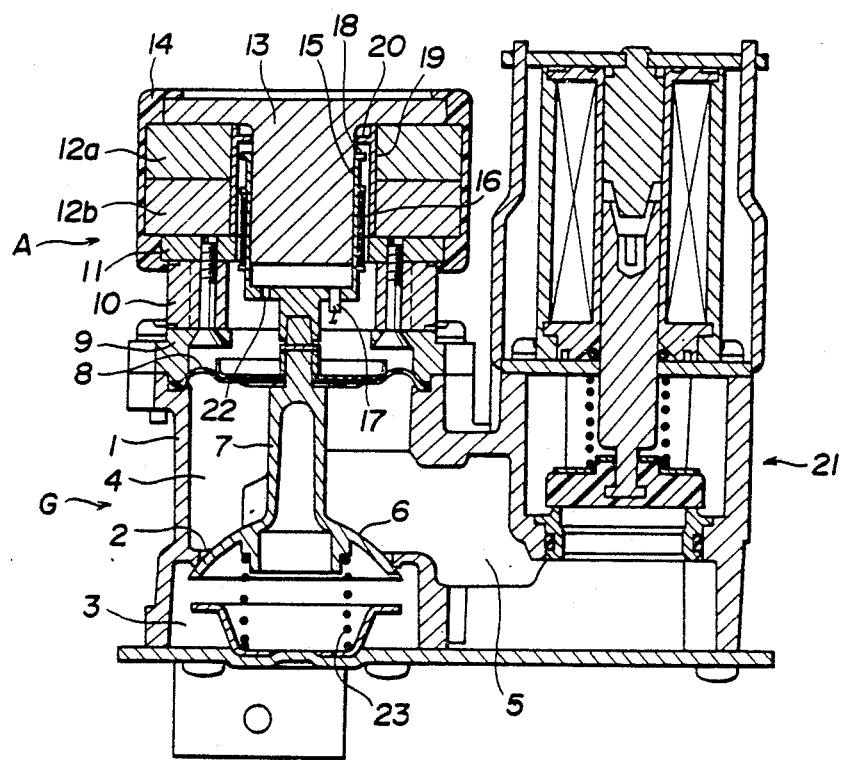
FIG. 1 is a vertical sectional view of a gas solenoid valve according to a preferred embodiment of the present invention.

A preferred embodiment of the present invention will be described hereunder with reference to the accompanying drawings.

FIG. 1 is a vertical view showing a cross section of an entire gas solenoid valve according to the present invention. FIG. 2 is a perspective view showing only a part of the gas solenoid which is material to the present invention.

A gas solenoid valve body designated by 1 is formed with a valve port 2. A chamber 3 of the valve body 1 is communicated with a gas inlet port, while another chamber 4 is communicated with an outlet port 5. Inserted into the valve port 2 is a half-spherical valve disc 6 which is connected to a diaphragm 8 through a valve shaft 7. With all the above components, a governing mechanism or governing portion G is constituted.

On the upper side of the valve body 1, there are mounted a stay 9 and a mount 10, as well as a magnetic disc 11 and magnets 12a, 12b, said magnetic disc 11 and magnets 12a, 12b forming a magnetic circuit. The magnets 12a, 12b are of ring shapes. A fixed iron core 13 generally in the shape of a circular column is inserted through a central bore of the magnets 12a, 12b. Said fixed iron core 13, magnets 12a, 12b and magnetic disc 11 are covered at the exterior thereof with a synthetic resin outer film 14 by means of molding, thereby ensuring the stationary positions of said respective components.

A coil-holder 15 with a generally hollow cylindrical configuration has a magnetic coil 16 wound around its outer periphery. Said fixed iron core 13 is inserted into the coil-holder 15 which couples with the upper end of the valve shaft 7. A terminal 17 is adapted to flow current into said magnetic coil 16.

Interposed between the fixed iron core 13 and the magnets 12a, 12b, is a sleeve 19 which is inserted therethrough in order to fix the inner side positions of the magnets and to obtain a space for the magnetic coil 16 to slide. The sleeve 19 is rigidly formed at its upper inside wall of the cylindrical portion with a flange 20 facing inwardly as shown in its enlarged form in FIG. 2. The flange 20 facing inwardly is highly accurately measured out so that the inner periphery thereof is intimately contacted with the outer periphery of the fixed iron core 13. The width of the flange 20 facing inwardly is arranged to be constant in the radial direction of the fixed iron core 13.

With all the above components, an actuating mechanism or actuating portion A is constituted for said governing portion G.

When the current is not run into the magnetic coil 16 which is wound around the coil-holder 15 of the acutating portion A, the magnetic coil 16 as well as coil-holder 15 are fixed in position as they are without any movement in spite of the presence of the magnets 12a, 12b, since a magnetic field is not generated by the magnetic coil 16. However, when current is run into the magnetic coil 16, a magnetic field is produced by the magnetic coil 16. As a result, due to interaction between a magnetic field produced by the magnetic coil 16 and magnetic fields produced by the magnets 12a, 12b, the coil-holder 15 with said magnetic coil 16 wound therearound is actuated to move toward the lower side in FIG. 1 (away from the magnets) resisting the biasing force of a return spring 23. The actuating amount or stroke depends on the amount of current passing through said magnetic coil 16. When the coil-holder 15 is lowered, the valve disc 6 is pushed down by the valve shaft 7 to open the valve port 2. As a result, a gas in the chamber 3 at the gas inlet port side passes through the valve port 2, the chamber 4, the outlet port 5 and a closing valve 21, and is finally fed into a burner through an outlet port of the closing valve 21. In the chamber 4, since the lower surface of the diaphragm 8 is larger in its dimension than the upper surface of the valve disc 6, when the gas pressure flow into the chamber 4 is increased, the diaphragm 8 is pushed up to move the valve disc 6 in the valve closing direction. As a result, the passing amount of flowing gas is controlled so that an increase of the gas pressure at the outlet port side is prevented. In this way, a feeding gas pressure can be controlled and kept at a constant state.

Furthermore, the feeding amount of gas can also be controlled simply by changing the amount of current passing through the magnetic coil 16, since by doing so, the magnetic field generated between the magnetic coil 16 and the magnets 12a, 12b is varied, thereby controlling the opening degree of the valve port 2.

According to the present invention, since the coil-holder 15 with the magnetic coil 16 wound therearound can move smoothly and the relative position between the magnetic coil 16 and the magnets 12a, 12b can be maintained in a constant state, the magnetic character is kept stable and the flowing amount of gas can be controlled highly accurately.

Also, in order to introduce the magnetic flux generated by the magnetic coil 16 into the fixed iron core 13 effectively, it is desirable to minimize the space, as much as possible, defined between the fixed iron core 13 and the coil-holder 15. However, when said space is minimized, the air between the undersurface of the fixed iron core 13 and the bottom portion of the coil-holder 15 can become pressurized or subject to a vacuum. As a result, smooth movement of the coil-holder 15 is jeopardized due to pressure fluctuation. Because of the foregoing reason, a through-hole 22 is formed in the bottom portion of the coil-holder 15 so that air in the coil-holder 15 can pass in and out thereof.

An annular flange 18 may be rigidly formed on the upper end of the coil-holder 15. Usually, it is preferable to mold the coil-holder 15 intergrally with the flange 18 by means of a synthetic resin. The outer diameter of the flange 18 of the coil-holder 15 is highly accurately formed in a manner as to be slightly smaller than the inner diameter of the sleeve 19. Consequently, when the sleeve 19 is inserted into the magnets 12a, 12b in order to accomodate the fixed iron core 13 therein as shown in FIG. 1, the inner periphery of the sleeve 19 and the outer periphery of the fixed iron 13 are substantially coaxial with respect to each other, which ensures that the space formed therebetween is constant. Also, in the above state, i.e., the fixed iron core 13 is enclosed in the coil-holder 15 and the fixed iron core 13 is inserted in said sleeve 19, the sleeve 19 is not contacted with the outer periphery of the fixed iron core 13, and the outer marginal end of the flange 18 formed on the upper end of the coil-holder 15 slides along and is guided by the inner wall of the sleeve 19.

As described in the foregoing, according to the present invention, since the coil-holder is moved within the sleeve accomodated in the magnets, the smooth movement of the coil-holder will never be jeopardized by a fin of the molding synthetic resin. Moreover, since the dimension between the inner wall of said sleeve and the fixed iron core is maintained highly accurately, the inner wall of the sleeve can also be used as a guiding means for the coil-holder to slide therealong.

Having thus described the preferred embodiment of the invention, it should be understood that numerous structural modifications and adaptations may be resorted to without departing from the spirit of the invention.

What is claimed is:

1. A gas solenoid valve comprising:
 a fixed iron core extending in a longitudinal direction;
 at least one magnet extending in said longitudinal direction around said fixed iron core and spaced therefrom by a predetermined distance;
 magnetic member means for completing a magnetic circuit with said fixed iron core and said at least one magnet;
 a molded resin coating disposed on said fixed iron core, said at least one magnet and said magnetic member means;
 a sleeve interposed between all of said at least one magnet and said fixed iron core so as to block any resin from interfering with movement of a coil-holder;
 said coil-holder slidably disposed between said sleeve and said fixed iron core;
 magnetic coil means disposed on said coil-holder for causing said coil-holder to move in said longitudinal direction in response to current applied to said magnetic coil means; and
 valve means connected to said coil-holder for regulating flow of a gas into said solenoid valve in response to actuation of said magnetic coil means.

2. The gas solenoid valve of claim 1, wherein said sleeve includes a flange which abuts said fixed iron core.

3. The gas solenoid valve of claim 1, wherein said coil-holder includes a flange which extends towards said sleeve but does not contact said sleeve to allow coil-holder to slide freely in said longitudinal direction.

4. The gas solenoid valve of claim 1, wherein a portion of said coil-holder encloses an end of said fixed iron core, said portion having an opening therethrough for avoiding gas pressure fluctuation in a space formed between said portion of said coil-holder and said end of said fixed iron core.

5. The gas solenoid valve of claim 1, further comprising diaphragm means connected to said valve means for urging said valve means to a closed state in response to increased pressure of said gas admitted into said solenoid valve by said valve means to thereby prevent an increase in pressure of said gas passing through said valve means.

6. The gas solenoid valve of claim 5, wherein a shaft connects said coil-holder to said valve means and said diaphragm means is disposed on said shaft between said coil-holder and said valve means.

7. The gas solenoid valve of claim 1, further comprising an additional closing valve means for preventing gas admitted into said solenoid valve by said valve means from passing out of said solenoid valve.

8. The gas solenoid valve of claim 1, further comprising spring means for urging said valve means to a closed state.

9. A gas solenoid valve comprising:
a housing;
a fixed iron core extending in a longitudinal direction;
at least one magnet extending in said longitudinal direction around said fixed iron core and spaced therefrom by a predetermined distance;
magnetic member means for completing a magnetic circuit with said fixed iron core and said at least one magnet;
a molded resin coating disposed on said fixed iron core, said at least one magnet and said magnetic member means to form an assembly thereof, said assembly being disposed on said housing;
a sleeve interposed between all of said at least one magnet and said fixed iron core so as to block any resin from interfering with movement of a coil-holder;
said coil-holder slidable in said longitudinal direction and disposed between said sleeve and said fixed iron core;
magnetic coil means disposed on said coil-holder for causing said coil-holder to move in said longitudinal direction a distance which is proportional to an amount of current applied to said magnetic coil means;
an inlet in said housing for admitting a gas therein; and
valve means in fluid communication with said inlet and connected to said coil-holder for opening and closing said inlet in response to current applied to said magnetic coil means.

10. The gas solenoid valve of claim 9, wherein said sleeve includes a flange which abuts said fixed iron core.

11. The gas solenoid valve of claim 9, wherein said coil-holder includes a flange which extends towards said sleeve but does not contact said sleeve to allow said coil-holder to slide freely in said longitudinal direction.

12. The gas solenoid valve of claim 9, wherein a portion of said coil-holder encloses an end of said fixed iron core, said portion having an opening therethrough for avoiding gas pressure fluctuation in a space formed between said portion of said coil-holder and said end of said fixed iron core.

13. The gas solenoid valve of claim 9, further comprising diaphragm means connected to said valve means for urging said valve means to a closed state in response to increased pressure of said gas admitted into said solenoid valve by said valve means to thereby prevent an increase in pressure of said gas passing through said valve means.

14. The gas solenoid valve of claim 13, wherein a shaft connects said coil-holder to said valve means and said diaphragm means is disposed on said shaft between said coil-holder and said valve means.

15. The gas solenoid valve of claim 9, further comprising an additional closing valve means for preventing gas admitted into said solenoid valve by said valve means from passing out of said solenoid valve.

16. The gas solenoid valve of claim 9, further comprising spring means for urging said valve means to a closed state.

* * * * *